Patented Mar. 30, 1948

2,438,584

UNITED STATES PATENT OFFICE 2,438,584

PREPARATION OF NONSINTERED IRON CATALYST

Meredith M. Stewart, Beacon, N. Y., assignor to The Texas Company, New York, N. Y., a corporation of Delaware No Drawing. Application December 22, 1945, Serial No. 637,114

4 Claims. (Cl. 252—257)

1

This invention relates to the preparation and regeneration of an iron catalyst and to the catalytic conversion of carbon monoxide and hydrogen into hydrocarbons, oxygenated hydrocarbons and the like with the catalyst.

In accordance with the invention, an iron compound which yields iron oxide on roasting, as for example a salt such as ferric carbonate, an ore such as limonite, or a spent iron catalyst, is finely-ground and placed in a reactor. The state of subdivision to which the oxide-forming compound is ground is governed by the type of conversion process wherein it is to be employed for the hydrogenation of carbon monoxide. An oxygen-containing gas, such as air, is passed through a mass of the finely divided compound at an elevated temperature until all or substantially all of the carbonaceous material present is removed by roasting. Steam and oxygen are then passed in contact with the roasted material at an elevated temperature. The passage of steam and oxygen is continued until the composition of the effluent gas stream is substantially similar to that of the entering gas. At this point, the introduction of oxygen is discontinued and the iron-containing material is treated with steam alone in order to purge molecular oxygen from the catalyst. The treatment with steam is continued until the effluent leaving the reactor is free from molecular oxygen. Thereafter, the iron-containing material is subjected to treatment with hydrogen in the presence of steam until there is no substantial difference between the compositions of the gases entering and leaving the reaction zone. At this point, the iron-containing material assumes the magnetite type of structure. The introduction of steam is now discontinued and hydrogen alone is passed through the reaction zone in contact with the iron-containing material in the form of magnetite to effect reduction to metallic iron powder of high catalytic activity and in non-sintered form.

The resulting iron powder of high catalytic activity provides an effective catalyst for the hydrogenation of carbon monoxide. The catalyst can be introduced to a suitable reaction vessel wherein it is used as the catalyst. It is contemplated, however, that the foregoing preparation of the catalyst may be carried out in the reaction vessel wherein the hydrogenation of carbon monoxide is subsequently effected.

In carrying out the synthesis operation, synthesis gas comprising carbon monoxide and hydrogen in suitable proportions is introduced into the reaction zone. Under conversion conditions

2 of temperature and pressure, the mixture of carbon monoxide and hydrogen contacts the metallic iron catalyst and is thereby converted into hydrocarbons, oxygenated hydrocarbons and the like. Excellent conversions of synthesis gas into hydrocarbons, oxygenated hydrocarbons and the like are obtained using an iron catalyst prepared in the above fashion.

If the hydrogenation of carbon monoxide to hydrocarbons, oxygenated hydrocarbons and the like is to be carried out in a fluid type of catalytic conversion wherein the catalyst is maintained in the fluid state, the iron salt, iron ore or used iron catalyst is comminuted to such a state of subdivision that upon reduction of the magnetite which has been formed by the treatment, a metallic iron powder is obtained which has a particle size distribution which is advantageous for fluidization. For example, the iron salt should be ground so that there is obtained on final reduction a metallic iron powder which contains particles in the range of 100 to 400 mesh, which is suitable for fluidization. If a fixed bed type of conversion is employed for the hydrogenation of carbon monoxide, it is not necessary to effect such a fine subdivision of the iron salt.

The patent literature cites the advantage of effecting at least partial sintering of metallic iron catalysts which are employed in the hydrogenation of carbon monoxide. Partial sintering takes place above about 932° F., while complete sintering is effected above about 1112° F. A catalyst of high activity is obtained in the process of this invention without effecting even partial sintering as the highest temperature which is employed during the treatment as outlined is about 875° F.

Through X-ray investigation, I have discovered that the transformation of iron to the magnetite structure, as represented by the formula $Fe_3O_4$, prior to its reduction to the metallic state, is an essential step in the preparation of iron catalysts which are highly active in the hydrogenation of carbon monoxide to form hydrocarbon products. Utilizing the method of this invention, iron is converted to magnetite by a simplified method which dispenses with the high temperature fusion step employed in the conventional procedure of forming magnetite.

As has been indicated, the method of this invention is applicable to the initial preparation of an active catalyst for the hydrogenation of carbon monoxide or to the regeneration of an iron catalyst after it has lost its activity through continued use in the hydrogenation of carbon monoxide. There are considerable amounts of carbonaceous deposit present on a catalyst which has become spent in the hydrogenation of carbon monoxide. These carbonaceous deposits, which are formed by the slight amount of cracking which accompanies the hydrogenation of carbon monoxide, are removed as oxides of carbon through the treatment of the catalyst in the regeneration procedure with a gas-containing molecular oxygen.

The advantages which accrue from the use of the method of this invention for the preparation or regeneration of an iron catalyst and for the hydrogenation of carbon monoxide using a catalyst prepared in accord with the disclosure of this invention may be detailed as follows.

First, a catalyst with a more highly developed surface and of smaller particle size is obtained because a surface-destroying fusion step is not employed during the catalyst preparation. Consequently, a catalyst of greater activity is provided.

Secondly, it is possible to prepare or regenerate the catalyst in the same reactor in which the hydrogenation of carbon monoxide takes place. This prevents needless multiplication of equipment.

Thirdly, the method of the invention is particularly advantageous when a fluidized catalyst operation is employed to effect the catalytic conversion of carbon monoxide and hydrogen into hydrocarbons, oxygenated hydrocarbons and the like, since the steps in the preparation of the catalyst are expedited by the use of a fluidizing technique. The preparation or regeneration of the iron catalyst in a manner such that the finely divided iron-containing material is fluidized in each separate treating operation makes feasible the utilization of shorter treating times because of the better contact effected in a fluidized system.

In the following paragraphs, the effect of each separate treating operation is outlined and the approximate temperatures which are used in each step are detailed.

The treatment with a gas-containing molecular oxygen such as air is carried out at temperatures in the range of about 750° to 875° F. The effect of this treatment is to remove any carbon which may be present in the iron ore, iron salt or spent catalyst that serves as a starting material and to effect at least partial oxidation of metallic iron to either the ferrous or ferric state. As stated previously, the removal of carbon is of primary importance in the regeneration of a spent iron catalyst. Treatment with air at this temperature also converts iron salts which are convertible to the oxide form to ferrous or ferric oxide. The reactions taking place in this treatment may be briefly exemplified as follows:

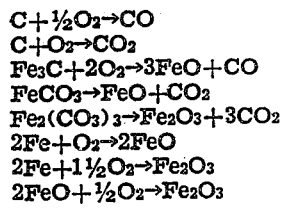

The treatment with air alone is continued until carbon oxides are no longer found in the effluent from the reactor in which the air treatment occurs. When there are no carbon oxides in the effluent, then the carbon originally present is removed.

Steam is then also introduced into the reactor as well as air so that the iron-containing material is treated with an approximately 50-50 mixture of air and steam at a temperature of about 700° to 800° F. The effect of the treatment with the mixture of air and steam is to further oxidize the iron-containing material to the higher oxides of iron. As a consequence of the treatment with this two-component stream, the iron is converted substantially either into ferric oxide, $Fe_2O_3$, or magnetite, $Fe_3O_4$. The following equations exemplify the reactions which take place during treatment with this mixture of air and steam.

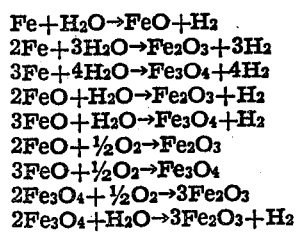

Treatment with this mixture of air and steam at 700° to 800° F. is continued until the composition of the gas entering the reactor is approximately the same as the composition of the gas leaving the reactor in which the treatment takes place. As may be ascertained from the above reactions, by the end of this treatment, most of the material is either in the form of ferric oxide or of magnetite.

The introduction of air is discontinued at this point and the iron-containing material is treated with steam alone at a temperature of about 700° to 800° F. in order to purge the catalyst of molecular oxygen. The next step in the preparation is treatment with a mixture of steam and hydrogen at 700° to 800° F. and the presence of molecular oxygen during this treatment would be deleterious as a highly exothermic reaction between hydrogen and molecular oxygen would take place.

The treatment with steam alone is continued until the effluent leaving the reactor is free from molecular oxygen.

In order to convert the ferric oxide present in the reactor into magnetite, hydrogen is introduced into the reactor together with the steam so that the mixture of ferric oxide and magnetite is treated with approximately a 50:50 mixture of steam and hydrogen. This is the critical step in the treatment. The steam has little effect upon the magnetite in the presence of the hydrogen while the hydrogen effects a partial reduction of the ferric oxide to magnetite. Ferric oxide would be reduced completely to metallic iron by the action of the hydrogen if it were not for the oxidizing effect of the steam. The treatment with the combined mixture of steam and hydrogen is likewise carried out at a temperature of 700° to 800° F. Partial reduction of ferric oxide to magnetite which is effected by the 50:50 mixture of steam and hydrogen is represented by the following equation:

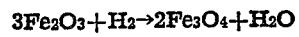

When this partial reduction is complete, which may be ascertained by the similarity in the compositions of the gases entering and leaving the reactor, the introduction of steam is discontinued and the iron which is now all in the form of magnetite, is reduced to the metallic state at about 700° to 800° F. by the action of hydrogen alone. The reduction of magnetite to a highly active iron catalyst may be represented by the following equation:

$$Fe_3O_4 + 4H_2 \rightarrow 3Fe + 4H_2O$$

A catalyst prepared or regenerated in this fashion proves to be highly active in the catalytic conversion of carbon monoxide and hydrogen into hydrocarbons, oxygenated hydrocarbons and the like. The presence of promoters such as potassia, alumina, magnesia, etc. enhances the activity of the catalyst. Consequently, provision may be made to incorporate small percentages of such promoters in the iron powder prior to its treatment in the manner outlined above.

An excellent representative catalyst contains two to three per cent alumina and one to two per cent potassium oxide and 95 to 97 per cent metallic iron.

After all the iron has been reduced to the metallic state, a synthesis gas comprising carbon monoxide and hydrogen may be introduced into the reactor wherein the preparation or regeneration took place. At a suitable temperature, e. g., 500° to 700° F. and at pressures ranging from atmospheric to 1,000 lbs. per square inch gauge, the mixture of carbon monoxide and hydrogen is catalytically converted by contact with the catalyst so prepared into hydrocarbons, oxygenated hydrocarbons and the like.

The catalytic hydrogenation of carbon monoxide may be carried out in a fixed bed reactor or a reactor adapted to fluidized dense phase conversion. If a fluid type of conversion is used, the preparation or regeneration of the catalyst may be performed according to the above outlined procedure using the fluid technique.

Thus, the density and velocity at which the mixture of steam and air pass through the reactor are correlated with the particle size and density of the catalyst which it contacts so that the iron-containing material is maintained in a state of fluidization. Since the utilization of a fluid system affords better contact between the reactant gas stream and the iron powder with which it reacts, it is possible to reduce the contact time of each gas stream by operating in this fashion.

The following example illustrates the nature of the invention and indicates the high catalytic efficiency which is obtained by preparing the catalyst in accord with the disclosure of this invention.

*Example*

Iron carbonate which is ground to about 200 or 500 mesh so that a metallic iron powder is obtained on final reduction whose particle size lies in the range of 100 to 400 mesh is placed in the reactor which is adapted to a fluidized system of catalytic conversion of carbon monoxide and hydrogen into hydrocarbons, oxygenated hydrocarbons and the like.

Alumina and potassium oxide are added to the iron carbonate in sufficient quantity so that upon final reduction, a catalyst is obtained which comprises 95 to 97% metallic iron, 2 to 3% alumina and 1 to 2% potassium oxide.

A stream of air is passed through the reactor in the temperature range of about 750° to 875° F. at a velocity such that the powder is maintained in a fluid state. This treatment is continued until the effluent from the reactor is free from oxides of carbon.

Steam is then introduced into the reactor concomitantly with air at a temperature of about 700° to 800° F., so that the powder is fluidized by an approximately 50–50 mixture of air and steam. The treatment with the mixture of air and steam is continued until the composition of the gas entering the reactor is approximately the same as the composition of the gas leaving the reactor.

The introduction of the air is discontinued and the powder is fluidized by steam alone at a temperature of 700° to 800° F. When the effluent from the reactor is free from molecular oxygen, hydrogen is also introduced into the reactor at about the same temperature so that the powder is fluidized by a mixture of steam and hydrogen at a temperature of about 700° to 800° F.

When the composition of the gases entering the reactor is substantially similar to the composition of the gases leaving the reactor, the introduction of steam is discontinued and the powder is fluidized by hydrogen alone at a temperature of about 700° to 800° F. This treatment results in the formation of a metallic iron powder of high catalytic efficiency whose particle size distribution lies in the range of 100 to 400 mesh.

The catalyst is subjected to the usual conditioning treatment which comprises treating the catalyst with a synthesis gas mixture of carbon monoxide and hydrogen at a temperature of about 100° below optimum reaction temperature, and slowly raising the temperature over a period of about 12 hours in small increments to the desired reaction temperature. During this conditioning treatment, the velocity of the synthesis gas stream is related to the particle size and density of the metallic iron catalyst so as to maintain the catalyst in a fluid state. In this particular example, the conditioning treatment comprises passing the synthesis gas at about 250 pounds pressure through the reactor at initial temperature of 500° F. and slowly raising the temperature over a period of about 15 hours to 600° F.

Synthesis gas containing carbon monoxide and hydrogen in the ratio of about 1:2 is passed through the reactor at a temperature of about 600° F. at a velocity sufficient to maintain the powder in a fluid state. 98% of the carbon monoxide is converted on one passage through the reactor.

About a gallon of liquid hydrocarbon products per 1,000 cubic feet of synthesis gas is obtained. The liquid hydrocarbon product is highly olefinic in nature, the olefins comprising about 50% of the total product. Moreover, a large quantity of useful gaseous hydrocarbons such as butanes and pentanes are obtained in which the olefin content amounts to about 65%.

Obviously many modifications and variations of the invention, as hereinbefore set forth, may be made without departing from the spirit and scope thereof and, therefore, only such limitations should be imposed as are indicated in the appended claims.

I claim:

1. A method for the preparation of a non-sintered iron catalyst for the hydrogenation of carbon monoxide from an iron compound capable of conversion at least in part to iron oxides which comprises comminuting said iron compound in finely divided form, passing gas containing oxygen into contact with said compound at a temperature within the range of from about 750° F. to about 875° F. for a period of time sufficient to remove carbonaceous material and convert said compound into oxides of iron, passing a mixture of steam and oxygen into contact with the resulting material comprising oxides of iron 1. under conditions of temperature and contact time such that substantially all of the iron present is converted to ferric oxide, thereafter passing a mixture of hydrogen and steam into contact with the resulting material containing ferric oxide at a temperature within the range of from about 700° F. to about 800° F. for a period of time sufficient to convert the ferric oxide to magnetite, passing hydrogen into contact with said material containing magnetite at a temperature within the range of from about 700° F. to about 800° F. for a period sufficient to reduce the magnetite to metallic iron.

2. A method for forming a substantially non-sintered iron catalyst for the hydrogenation of carbon monoxide which comprises passing gas containing oxygen into contact with an iron compound capable of conversion, at least in part, to iron oxides and containing carbonaceous material, effecting said contact at a temperature within the range of from about 750° F. to about 875° F. for a period of time sufficient to remove by combustion substantially all of the carbonaceous material, passing a mixture of steam and oxygen into contact with the resulting iron catalyst free from carbon at a temperature within the range of from about 700° F. to about 800° F. for a period of time sufficient to effect conversion of at least a substantial portion of the iron to ferric oxide, passing a mixture of hydrogen and steam into contact with the ferric oxide at a temperature within the range of from about 700° F. to about 800° F. for a period of time sufficient to convert substantially all of the ferric oxide to magnetite, and thereafter passing hydrogen into contact with the catalyst material at a temperature within the range of from about 700° F. to about 800° F. for a period of time sufficient to reduce substantially all of the magnetite to metallic iron.

3. The method of forming a finely divided iron catalyst as defined in claim 2, wherein each of the steps is carried out under conditions of gas flow such that the solid material is maintained in a state of fluidization.

4. A method for the preparation of a non-sintered iron catalyst for the hydrogenation of carbon monoxide from an iron compound capable of conversion at least in part to iron oxides which comprises comminuting said iron compound in finely divided form, passing gas containing oxygen into contact with said compound at a temperature within the range of from about 750° F. to about 875° F. for a period of time sufficient to remove carbonaceous material and convert said compound into oxides of iron, passing a mixture of steam and oxygen into contact with the resulting material comprising oxides of iron under conditions of temperature and contact time such that at least a substantial portion of the iron present is converted to ferric oxide, thereafter passing a mixture of hydrogen and steam into contact with the resulting material containing ferric oxide at a temperature within the range of from about 700° F. to about 800° F. for a period of time sufficient to convert substantially all of the ferric oxide to magnetite, passing hydrogen into contact with said material containing magnetite at a temperature within the range of from about 700° F. to about 800° F. for a period sufficient to reduce the magnetite to metallic iron.

MEREDITH M. STEWART.

REFERENCES CITED

The following references are of record in the file of this patent:

UNITED STATES PATENTS

| Number | Name | Date |
|---|---|---|
| 1,729,697 | Apol et al. | Oct. 1, 1929 |
| 1,904,440 | Freyermuth | Apr. 18, 1933 |
| 2,129,142 | Kuentzel et al. | Sept. 6, 1938 |
| 2,254,748 | Michael | Sept. 2, 1941 |
| 2,254,806 | Michael | Sept. 2, 1941 |
| 2,287,891 | Linehk | June 30, 1942 |
| 2,292,570 | Klemm et al. | Aug. 11, 1942 |